US012573092B2

(12) United States Patent

Mogallapu et al.

(10) Patent No.: US 12,573,092 B2

(45) Date of Patent: Mar. 10, 2026

(54) DEPTH CAMERA CALIBRATION USING SPARSE DEPTH PATTERN

(71) Applicant: Microsoft Technology Licensing, LLC, Redmond, WA (US)

(72) Inventors: Vishali Mogallapu, Sunnyvale, CA (US); John Peter Godbaz, Sunnyvale, CA (US); Ling Zhu, Palo Alto, CA (US); Travis Jon Perry, Los Gatos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/797,324

(22) Filed: Aug. 7, 2024

(65) Prior Publication Data

US 2026/0044982 A1     Feb. 12, 2026

(51) Int. Cl.
| | |
|---|---|
| *H04N 23/56* | (2023.01) |
| *G01B 11/22* | (2006.01) |
| *G01S 7/4915* | (2020.01) |
| *G01S 7/497* | (2006.01) |
| *G01S 17/894* | (2020.01) |
| *G06T 5/80* | (2024.01) |
| *G06T 7/80* | (2017.01) |

(52) U.S. Cl.
CPC ............... *G06T 7/80* (2017.01); *G01B 11/22* (2013.01); *G01S 7/4915* (2013.01); *G01S 7/497* (2013.01); *G01S 17/894* (2020.01);

*G06T 5/80* (2024.01); *H04N 23/56* (2023.01); *G06T 2207/10028* (2013.01)

(58) Field of Classification Search
CPC ... G06T 7/80; G06T 5/80; G06T 2207/10028; G01S 17/894; G01S 7/4915; G01S 7/497; H04N 23/56; G01B 11/22
USPC ......................................................... 348/180
See application file for complete search history.

(56) References Cited

U.S. PATENT DOCUMENTS

| | | | | |
|---|---|---|---|---|
| 2014/0168378 | A1* | 6/2014 | Hall | ..................... H04N 13/257 348/47 |
| 2015/0279016 | A1* | 10/2015 | Kim | ..................... H04N 13/246 382/154 |

* cited by examiner

*Primary Examiner* — Nathan J Flynn
(74) *Attorney, Agent, or Firm* — Alleman Hall LLP

(57) ABSTRACT

Examples are disclosed relating to a method for calibrating a depth camera without requiring an external target. In one example, an environment is illuminated using an illumination source of the depth camera. The illumination source is configured to output modulated structured light comprising a pattern of dots. A raw depth image of illumination reflected from the environment is acquired via an optical sensor of the depth camera. Observed locations of dots in the pattern of dots are identified in the raw depth image. An objective function is applied to the observed locations of the dots in the pattern of dots in the raw image to generate a set of distortion correction parameters. A distortion corrected depth image generated based at least on translating pixel locations of pixels of the raw depth image according to the set of distortion correction parameters is output.

18 Claims, 7 Drawing Sheets

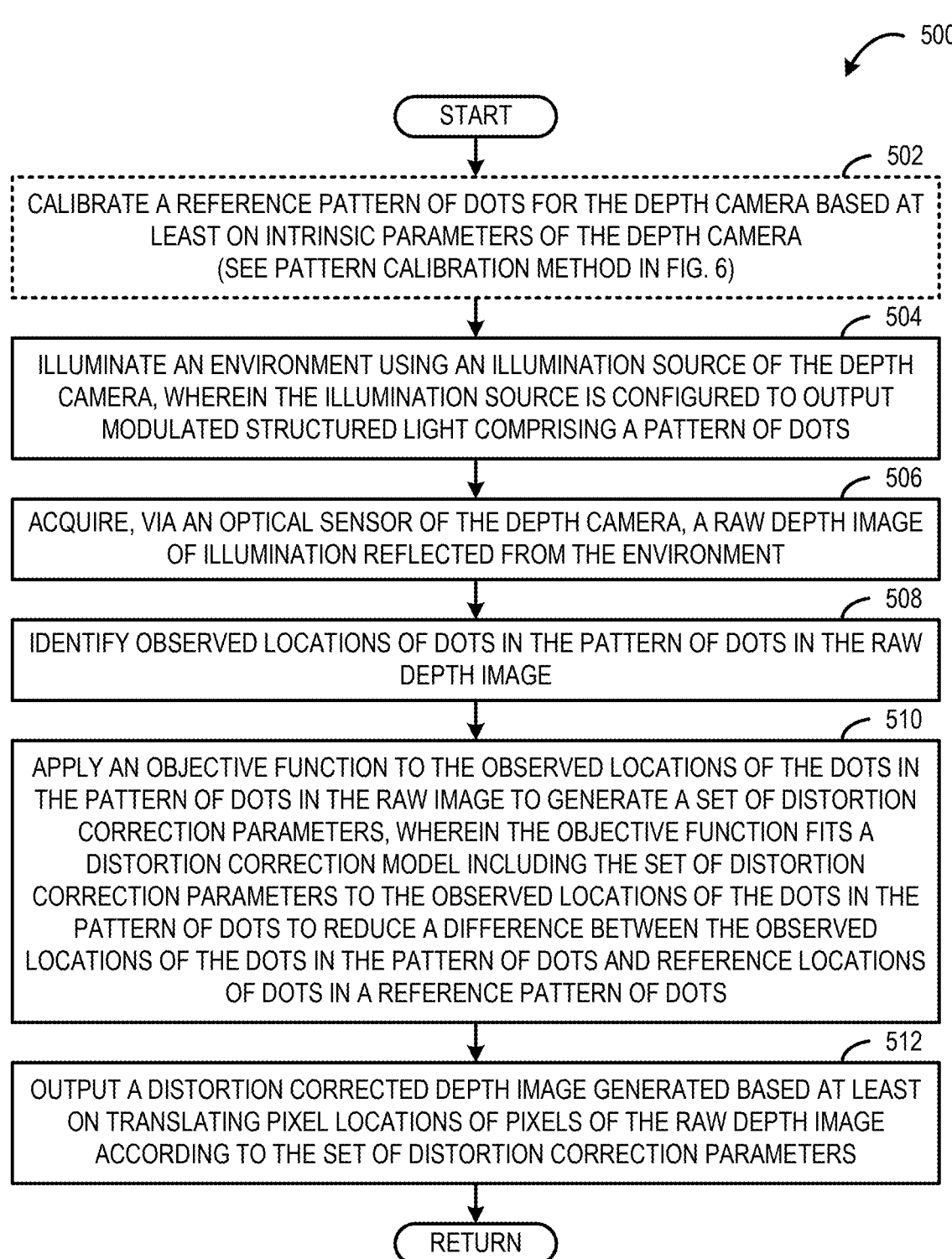

500

START

502

CALIBRATE A REFERENCE PATTERN OF DOTS FOR THE DEPTH CAMERA BASED AT LEAST ON INTRINSIC PARAMETERS OF THE DEPTH CAMERA
(SEE PATTERN CALIBRATION METHOD IN FIG. 6)

504

ILLUMINATE AN ENVIRONMENT USING AN ILLUMINATION SOURCE OF THE DEPTH CAMERA, WHEREIN THE ILLUMINATION SOURCE IS CONFIGURED TO OUTPUT MODULATED STRUCTURED LIGHT COMPRISING A PATTERN OF DOTS

506

ACQUIRE, VIA AN OPTICAL SENSOR OF THE DEPTH CAMERA, A RAW DEPTH IMAGE OF ILLUMINATION REFLECTED FROM THE ENVIRONMENT

508

IDENTIFY OBSERVED LOCATIONS OF DOTS IN THE PATTERN OF DOTS IN THE RAW DEPTH IMAGE

510

APPLY AN OBJECTIVE FUNCTION TO THE OBSERVED LOCATIONS OF THE DOTS IN THE PATTERN OF DOTS IN THE RAW IMAGE TO GENERATE A SET OF DISTORTION CORRECTION PARAMETERS, WHEREIN THE OBJECTIVE FUNCTION FITS A DISTORTION CORRECTION MODEL INCLUDING THE SET OF DISTORTION CORRECTION PARAMETERS TO THE OBSERVED LOCATIONS OF THE DOTS IN THE PATTERN OF DOTS TO REDUCE A DIFFERENCE BETWEEN THE OBSERVED LOCATIONS OF THE DOTS IN THE PATTERN OF DOTS AND REFERENCE LOCATIONS OF DOTS IN A REFERENCE PATTERN OF DOTS

512

OUTPUT A DISTORTION CORRECTED DEPTH IMAGE GENERATED BASED AT LEAST ON TRANSLATING PIXEL LOCATIONS OF PIXELS OF THE RAW DEPTH IMAGE ACCORDING TO THE SET OF DISTORTION CORRECTION PARAMETERS

RETURN

FIG. 5

COMPUTING SYSTEM 700

LOGIC SUBSYSTEM 702

STORAGE SUBSYSTEM 704

DISPLAY SUBSYSTEM 706

INPUT SUBSYSTEM 708

COMMUNICATION SUBSYSTEM 710

DEPTH CAMERA CALIBRATION USING SPARSE DEPTH PATTERN

BACKGROUND

Depth cameras are becoming more commonly used in a variety of consumer electronic devices. For example, some smartphones include integrated, front-facing depth cameras. Further, some laptops and other personal computers include integrated, user-facing depth cameras. Video game systems may include peripheral depth cameras for gesture recognition. Virtual and augmented reality headsets include integrated, world-facing depth cameras for machine vision and may further include user-facing depth cameras. In any of such depth cameras, the reliability of gesture recognition, face recognition, and other input modalities depends upon the fidelity of the underlying depth imaging, which can be affected by calibration of the depth camera.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to a method for calibrating a depth camera without requiring use of an external target, such as a checkerboard target. In one example, an environment is illuminated using an illumination source of the depth camera. The illumination source is configured to output modulated structured light comprising a pattern of dots. A raw depth image of illumination reflected from the environment is acquired via an optical sensor of the depth camera. Observed locations of dots in the pattern of dots are identified in the raw depth image. An objective function is applied to the observed locations of the dots in the pattern of dots in the raw image to generate a set of distortion correction parameters. The objective function fits a distortion correction model including the set of distortion correction parameters to the observed locations of the dots in the pattern of dots to reduce a difference between the observed locations of the dots in the pattern of dots and reference locations of dots in a reference pattern of dots. A distortion corrected depth image generated based at least on translating pixel locations of pixels of the raw depth image according to the set of distortion correction parameters is output.

BRIEF DESCRIPTION OF THE DRAWINGS

FIG. 5 shows a flow diagram of an example method for calibrating a depth camera.

DETAILED DESCRIPTION

Figure 1:
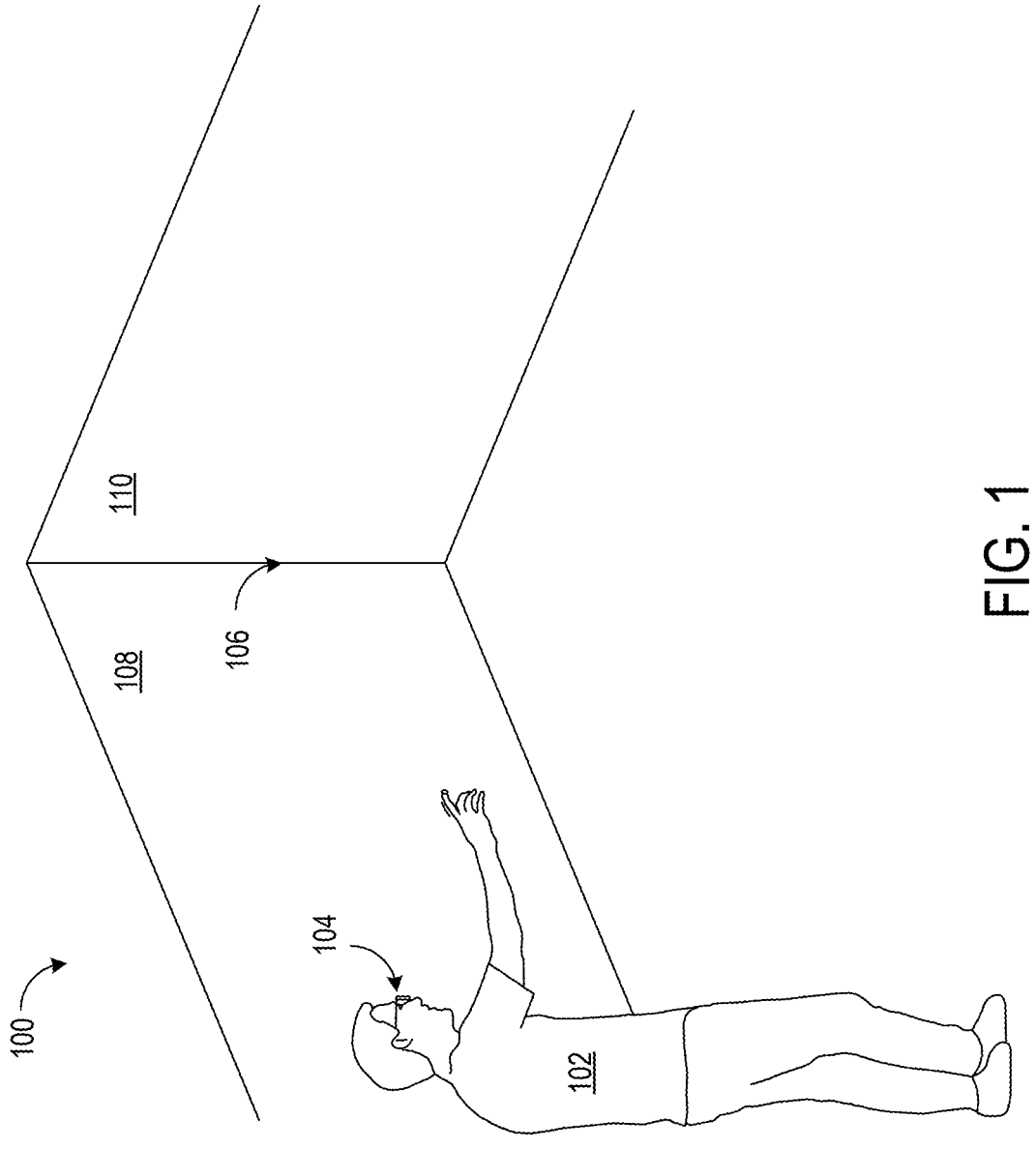
FIG. 1 shows an example environment for operating a depth camera.

Proper calibration of a depth camera, such as a Time of Flight (ToF) depth camera, help to provide accurate depth images. Calibration helps to correct for various distortions that stem from the optical structure of the depth camera (e.g., lens and optical sensor alignment).

Calibration of depth cameras often utilizes an external target, such as a checkerboard pattern or other known calibration pattern. The calibration pattern is positioned on a flat, rigid surface, such as a wall, in order minimize distortion of the checkerboard pattern relative to the depth camera. Multiple images of the calibration pattern are acquired by the depth camera from different angles and positions. Positions of features on the calibration pattern (e.g. the corners of squares of a checkerboard pattern) are detected in each image acquired by the depth camera. The positions of the corners in the images are compared to actual positions of the corners to calculate the intrinsic parameters (e.g., focal length and optical center) and distortion coefficients (which describe how the lens of the depth camera distorts the image) based on the differences between the positions. Once the depth camera is calibrated, the depth camera can use the calculated intrinsic parameters to correct distortions in depth images acquired by the depth camera.

Using an external target such as a checkerboard pattern to calibrate a depth camera can be effective, but there are various limitations and challenges associated with this conventional calibration method. As one example, a calibration pattern is typically designed for two-dimensional (2D) image calibration. Depth cameras require three-dimensional (3D) information, and a flat calibration pattern may not provide sufficient depth variation to accurately calibrate the depth sensor. As another example, depth cameras can suffer from inaccuracies due to reflective or transparent surfaces. Calibration patterns are sometimes printed on media that can reflect infrared light used by depth sensors, causing errors in depth measurements. As another example, properly aligning the checkerboard in different planes and orientations can be challenging. In many scenarios, calibrating a depth camera using a pattern utilizes expensive and complex calibration stations that are employed to maintain exact distances between a depth camera and the external target being imaged by the depth camera. As another example, depth cameras often operate under specific lighting conditions. Calibration patterns may not be easily detectable in low light or overly bright environments, affecting the calibration process.

Moreover, even when calibrated, ToF depth cameras can suffer from errors due to multipath and other factors. Active triangulation/structured illumination depth cameras can produce range images that do not suffer from multipath and are thus more suitable for applications such as object capture (which requires high accuracy). However, the active triangulation/structured illumination sensor can suffer performance problems if the depth camera is not properly calibrated or loses calibration over time (e.g., either the pattern or optics change over time).

FIG. 1 shows an example environment 100 for operating a depth camera. In this example, user 102 is operating a head-mounted device (HMD) 104 comprising a depth camera. Multipath effects are generated when multiple illumination paths are reflected to a pixel. Multipath effect can make it difficult to determine a true distance-to-object. This is particularly noticeable in locations such as room corner 106. While wall 108 and wall 110 may provide reliable distance-to-object measurements, high levels of illumination in room corner 106 results in multiple light bounces off of wall 108 and wall 110. The end result is that room corner 106 can appear curved in the resulting depth image.

Indirect ToF (iToF) with sparse depth (e.g., powerful dot grid illumination) provides significant improvements in performance under high ambient light (outdoor), for imaging darker objects, etc. relative to other ToF depth cameras. iToF cameras utilize a detected phase shift in received light to determine a depth at a pixel. Multiple different illumination frequences can be used to increase an unambiguous depth sensing range (due to the phase of received light wrapping every $2\pi$ radians). A fixed dot pattern is used to sparsely illuminate the environment, thus concentrating the illumination into small sub regions of the image, and effectively increasing optical power. Sparse depth solves multipath issues caused by multiple diffuse reflections within a scene by reducing the number of reflections and increasing the signal-to-noise (SNR) relative to the multipath interference. Reflections are generally diffuse at low spatial frequencies. The structured dots are concentrated, so the ratio of true signal to multipath reflections is high. Sparse depth also enables hybrid depth imaging, where triangulation among the sparse-projection features provides an independent depth value suitable to assist phase unwrapping (e.g., disambiguating wrapped phase data using multiple images acquired using different illumination frequencies) or other aspects of ToF imaging. iToF, sparse depth cameras still require calibration in order to accurately determine where the dots are in received images.

Accordingly, examples are disclosed relating to a method for calibrating a depth camera without requiring an external target, such as a checkerboard target. In one example, an environment is illuminated using an illumination source of the depth camera. The illumination source is configured to output modulated structured light comprising a pattern of dots. A raw depth image of illumination reflected from the environment is acquired via an optical sensor of the depth camera. In example, the "raw" depth image refers to a depth image generated by the depth camera that has not been corrected for distortion. Observed locations of dots in the pattern of dots are identified in the raw depth image. An objective function is applied to the observed locations of the dots in the pattern of dots in the raw image to generate a set of distortion correction parameters. The objective function fits a distortion correction model including the set of distortion correction parameters to the observed locations of the dots in the pattern of dots to reduce a difference between the observed locations of the dots in the pattern of dots and reference locations of dots in a reference pattern of dots. A distortion corrected depth image generated based at least on translating pixel locations of pixels of the raw depth image according to the set of distortion correction parameters is output.

Such an approach can be employed to achieve accurate calibration of an iToF, sparse depth camera without using an external target or a costly calibration station. Moreover, since the calibration approach does not require an external target, the calibration approach can be performed dynamically in various environments, and can be performed repeatedly over the operational lifespan of the depth camera in order to maintain calibration.

Furthermore, the technical feature of generating the sparse depth pattern of dots having a high SNR provides the benefit of allowing for the calibration method to be performed in diverse ambient lighting conditions while still provide accurate calibration without requiring an external target. Further, the technical feature of applying the objective function to fit the distortion correction model to the observed locations of the dots in the pattern of dots provides the technical benefit of producing a highly accurate set of distortion correction parameters that allows for precise calibration of the depth camera.

Figure 2:
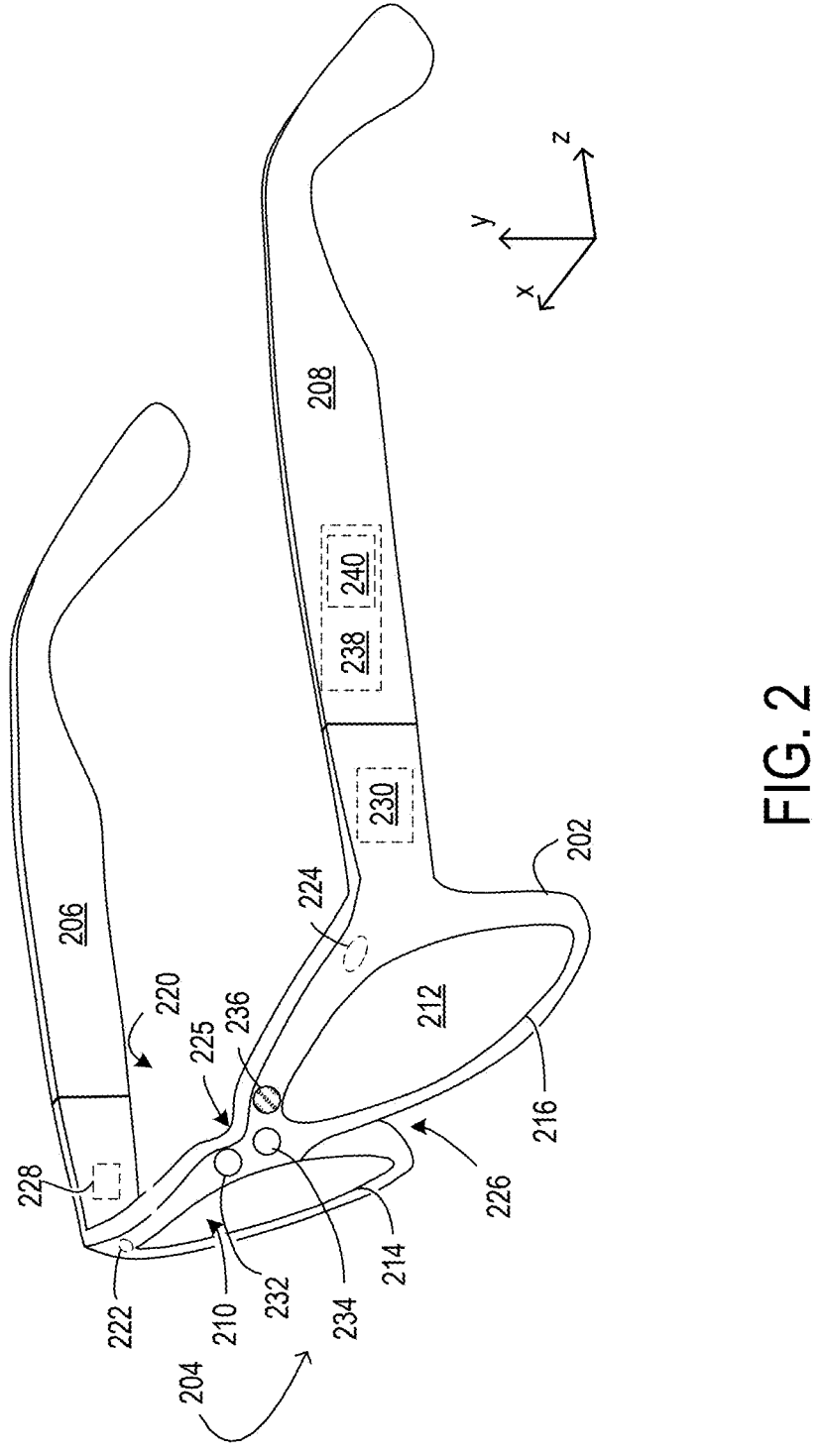
FIG. 2 shows an example head-mounted device including a depth camera.

FIG. 2 shows one example of a head-mounted device (HMD) 200. The HMD 200 includes a frame 202, a display system 204, and temple pieces 206 and 208. Display system 204 includes a first display 210 and a second display 212 supported by frame 202. Each of first display 210 and second display 212 include optical components configured to deliver a projected image to a respective eye of a user. HMD 200 may be an example of HMD device 104 shown in FIG. 1.

Display system 204 includes a first display module 214 for generating and displaying a first image via first display 210, and a second display module 216 for generating and displaying a second image via the second display 212, where the first image and the second image combine to form a stereo image. In other examples, a single display module generates and displays first images and second images via first display 210 and second display 212, respectively. Each display module may comprise any suitable display technology, such as a scanned beam projector, a microLED (light emitting diode) panel, a microOLED (organic light emitting diode) panel, or an LCoS (liquid crystal on silicon) panel, as examples. Further, various optics, such as waveguides, one or more lenses, prisms, and/or other optical elements may be used to deliver displayed images to a user's eyes.

HMD 200 further includes an eye-tracking system 220, comprising at least a first eye-tracking camera 222 and a second eye-tracking camera 224. Data from the eye-tracking system 220 may be used to detect user inputs and to help render displayed images in various examples. Eye-tracking system 220 may further include a light source 225. Light emitted by light source 225 may reflect off of a user's eye and be detected by first eye-tracking camera 222 and a second eye-tracking camera 224. In some examples, the light source and the camera of the eye-tracking system are both located on frame 202 HMD 200.

The position of the user's eye(s) may be determined by eye-tracking system 220 and/or gesture recognition machine 228. For example, eye-tracking system 220 may receive image data from first eye-tracking camera 222 and second eye-tracking camera 224, and may evaluate that data using one or more neural networks or other machine-learning devices.

HMD 200 further includes an on-board computing system in the form of a controller 230 configured to render the computerized display imagery via first display module 214 and second display module 216. Controller 230 is configured to send appropriate control signals to first display module 214 to form a right-eye image of a stereoscopic pair of images. Likewise, controller 230 is configured to send appropriate control signals to second display module 216 to form a left-eye image of the stereoscopic pair of images. Controller 230 may include a logic subsystem and a storage subsystem, as discussed in more detail below with respect to FIG. 6. Operation of HMD 200 additionally or alternatively may be controlled by one or more remote computing device(s) (e.g., in communication with HMD 200 via a local area network and/or wide area network).

HMD 200 may further include various other components, for example an outward facing two-dimensional image camera 232 (e.g., a visible light camera and/or infrared camera), an outward facing depth imaging device 234, and an outward facing depth illuminating device 236. Outward facing depth imaging device 234 and outward facing depth illumination device 236 can be offset in the X and/or Y dimensions at a baseline distance. In a headset/glasses form-factor a 10-30 mm baseline can be used in some examples. While smaller baselines below 10 mm are possible, the advantages of this approach can be enhanced with larger baselines, as this increases the disparity for a given Z. For specialized long range sensors, baselines such as 100 mm can be used in some examples but are more likely to be challenging in a headset/glasses form-factor HMD 200 may further include a sensor suite 238. Sensor suite 238 may include one or more inertial measurement units (IMUs) 240, which may include one or more accelerometers, gyroscopes, and/or magnetometers. IMUs 240 may be configured to generate positional information for HMD 200 that allows for determining a 6-degree-of-freedom (6DOF) position of the device in an environment. HMD 200 may further include various components that are not shown, including but not limited to speakers, microphones, temperature sensors, touch sensors, biometric sensors, other image sensors, energy-storage components (e.g., battery), a communication facility, a global positioning system (GPS) receiver, etc.

The HMD 200 is one example of a device that employs a depth camera that can be calibrated according to the calibration method of the present disclosure. In other examples, a depth camera may be integrated in other types of devices. The calibration method of the present disclosure is broadly applicable to any suitable depth camera that is configured to emit modulated structured light in a pattern, such as an iToF sparse depth camera.

Figure 3:
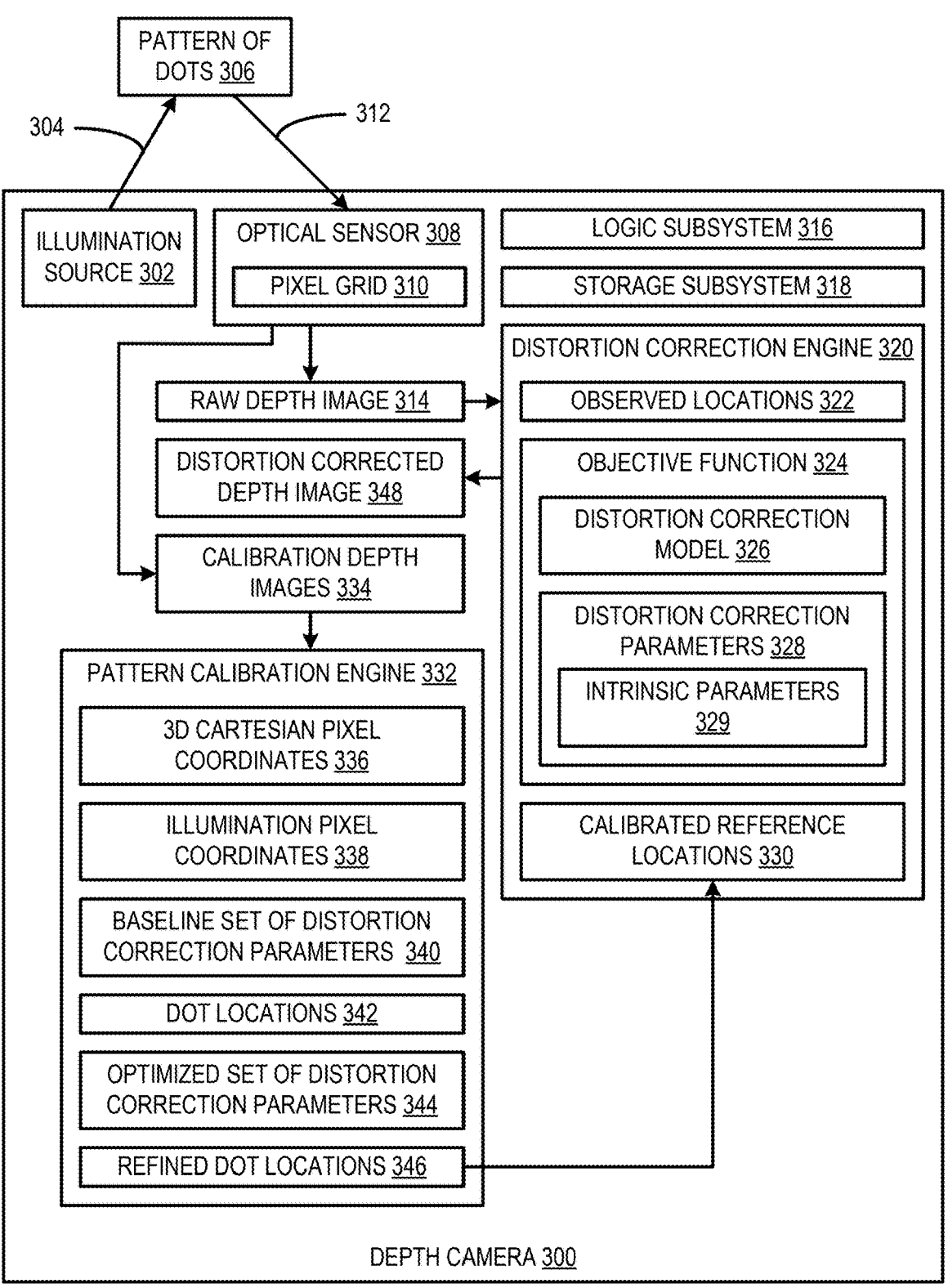
FIG. 3 schematically shows a system block diagram of an example depth camera.

FIG. 3 schematically shows a block diagram of an example depth camera 300. For example, the depth camera 300 may be representative of the outward facing depth imaging device 234 and the outward facing depth illuminating device 236 of the HMD 200 shown in FIG. 2.

Depth camera 300 includes one or more illumination source(s) 302. For example, illumination source(s) 302 are configured to output modulated structured light 304 comprising a pattern of dots 306. More particularly, the modulated light is given a structural arrangement of units that can be organized in a repeating pattern, such as in a grid, or randomized pattern. Herein, the unit is described as a dot, but other shapes may be used. The illumination source(s) 302 may thus project a structured light image onto a scene or environment where the projected light is also modulated. In such an example, the source of modulated light may be an incoherent light source, which emits transmitted light that is modulated with a signal at a modulation frequency. In an example, the amplitude of light from the device may be modulated such that the amount of illumination changes periodically. In a phase modulation system, the light emitter can output amplitude modulated light at multiple modulation frequencies. Further, the illumination source(s) 302 may be selected so that the wavelength or wavelengths of the emitted light include the most appropriate wavelength(s) for a particular application and/or the characteristics of the environment being imaged.

In some examples, the depth camera 300 can have a single light source and single imaging system. However, in other examples, illumination source(s) 302 include a separate ToF light source and a separate structured light source. In such examples, the ToF light source emits amplitude modulated light suitable for ToF depth calculations. The structured light source emits structured light that is not modulated.

In some implementations, the illumination source(s) 302 are configured to output modulated structured infrared (IR) or near-infrared (NIR) light comprising the pattern of dots 306. Such IR or NIR light is not visible to the human eye and allows for operation that is not perceived by a user of the depth camera, and thus does not disturb the experience of the user with a visible structured light pattern.

The depth camera 300 includes an optical sensor 308 that comprises a 2D pixel grid 310. Optical sensor 308 can be used to capture illumination 312 reflected from the environment. The illumination 312 includes the structured light forming the pattern of dots 306. The optical sensor 308 is configured to output a raw depth image 314 based at least on the illumination 312 including the pattern of dots 306 reflected from the environment. The raw depth image 314 comprises a plurality of depth values corresponding to the pixels of the 2D pixel grid 310 of the optical sensor 308.

The depth camera 300 comprises a logic subsystem 316 and a storage subsystem 318 that holds instructions executable by the logic subsystem 316 to perform computing operations that facilitate operation of the depth camera 300. More particularly, the storage subsystem 318 holds instructions that are executable by the logic subsystem 316 to execute a distortion correction engine 320 that is configured to calibrate the depth camera 300 such that depth images output by the depth camera 300 are corrected to compensate for distortion.

The distortion correction engine 320 is configured to receive a raw depth image 314 from the optical sensor 308. The distortion correction engine 320 is configured to identify observed locations 322 of dots in the pattern of dots 306 in the raw depth image 314. In one example, the observed locations 322 of the dots in the pattern of dots 306 are defined in terms of illumination coordinates that describe pixel positions in a normalized coordinate system corresponding to the 2D pixel grid 310 of the optical sensor 308 (e.g., (u, v) representing the horizontal position and the vertical position within this normalized space).

The distortion correction engine 320 is configured to apply an objective function 324 to the observed locations 322 of the dots in the pattern of dots 306 in the raw depth image 314 to generate a set of distortion correction parameters 328. The objective function 324 fits a distortion correction model 326 including the set of distortion correction parameters 328 to the observed locations 322 of the dots in the pattern of dots 306 to reduce a difference between the observed locations 322 of the dots in the pattern of dots 306 and reference locations 330 of dots in a reference pattern of dots.

The distortion correction model 326 can vary depending on the implementation and the optical structure (e.g., lens and optical sensor alignment) of the depth camera 300. In some examples, the distortion correction model 326 is a lens distortion correction model. More particularly, in some examples, the distortion correction model 326 may be a radial distortion correction model that corrects for distortion that is radially symmetric around the center of the image. In other examples, the distortion correction model 326 is a pin cushion distortion correction model. In further examples, the distortion correction model 326 is a barrel distortion correction model. In these examples, the set of distortion correction parameters 328 includes radial distortion coefficients (e.g., $K_1$, $K_2$, $K_3$) that correct radial distortion.

In some examples, the distortion correction model 326 may be a tangential distortion correction model that corrects for distortion that occurs when the lens and the image plane of the optical sensor 308 are not parallel. In such examples, the set of distortion correction parameters 328 includes tangent distortion coefficients (e.g., $T_1$, $T_2$, $T_3$) that correct for tangential distortion.

In some examples, the distortion correction model is a Brown-Conrady model that corrects both radial and tangential distortion. In such examples, the set of distortion correction parameters 328 includes radial distortion coefficients (e.g., $K_1$, $K_2$, $K_3$) and tangential distortion coefficients (e.g., $T_1$, $T_2$, $T_3$). In further examples, the distortion correction model 326 may be a different type of distortion correction model.

The set of distortion correction parameters 328 may include intrinsic parameters 329 of the depth camera 300. In one example, the set of distortion correction parameters 328 includes a principal point of the optical sensor 308 and a focal length of the optical sensor 308.

The objective function 324 may include any suitable type of mathematical function that can be applied to the observed locations 322 of the dots in the pattern of dots 306 in the raw depth image 314 to generate the set of distortion correction parameters 328 such that the distortion correction model 326 reduces the difference between the observed locations 322 of the dots in the pattern of dots 306 and reference locations 330 of dots in the reference pattern of dots. In some examples, the objective function 324 is configured to minimize the difference between the observed locations 322 of the dots in the pattern of dots 306 and reference locations 330 of dots in the reference pattern of dots by optimizing the set of distortion correction parameters 328 in order to achieve the most accurate distortion correction. The term "minimize" indicates that a difference between locations 322 and reference locations 330 has met a condition that satisfies a condition for exiting the minimization process, whether or not an actual local or global minimum is reached.

In one example, the objective function 324 is as follows:

Minimize $\Sigma_{i=1}^{M} \| [u_i^{ref}, v_i^{ref}] - [\hat{u}_i, \hat{v}_i] \|$ $(K_1, K_2, K_3 \ldots, T_1, T_2, C_1, C_2, F_1, F_2)$ where i is the pixel, M is the total number of pixels, where $K_1$, $K_2$, $K_3$ . . . are the radial distortion correction coefficients, where $T_1$, $T_2$ are the tangential distortion correction coefficients, where $C_1$, $C_2$, are the principal points, where $F_1$, $F_2$ are the focal lengths, where $u_i^{ref}$, $v_i^{ref}$ are reference locations of the dots in the pattern of dots 306, and where $[\hat{u}_i, \hat{v}_i]$ are the distortion corrected locations of the dots in the pattern of dots 306 after undistortion is applied using the optimized set of distortion correction parameters (e.g., $K_1$, $K_2$, $K_3$ . . . , $T_1$, $T_2$. $C_1$, $C_2$, $F_1$, $F_2$). In some examples, the set of distortion correction parameters can be selected/ refined to minimize the difference between the reference locations 330 of the dots in the reference pattern of dots and the observed location 322 of the dots in the pattern of dots in the raw depth image 314.

In other examples, a different objective function 324 may be applied to the observed locations 322 of the dots in the pattern of dots 306 in the raw depth image 314 to generate the optimized set of distortion correction parameters 328.

In some implementations, the reference pattern of dots including the reference locations 330 of the dots in the reference pattern of dots is pre-calibrated based at least on the intrinsic parameters 329 of the depth camera 300. For example, the reference locations 330 of the dots in the reference pattern of dots can be pre-calibrated for the depth camera 300 in a factory setting during manufacture of the depth camera.

In some implementations, the storage subsystem 318 holds instructions that are executable by the logic subsystem 316 to execute a pattern calibration engine 332 that is configured to calibrate the reference locations of the dots 330 of the reference pattern of dots for the depth camera 300 based at least on the intrinsic parameters 329 of the depth camera 300.

In one example, the pattern calibration engine 332 is configured to perform a pattern calibration process that includes sending control signals to the illumination source 302 to illuminate the environment with the pattern of dots 306.

The pattern calibration engine 332 is configured to send control signals to the optical sensor 308 to acquire a plurality of calibration depth images 334 of illumination reflected from the environment at different distances relative to a reference location in the environment. The reference location can be any suitable location that provides a reference to determine different distances for the plurality of calibration depth images 334.

The pattern calibration engine 332 is configured to receive the plurality of calibration depth images 334 and calculate 3D Cartesian coordinates 336 for each pixel of a plurality of pixels of each calibration depth image of the plurality of calibration depth images 334 based at least on depths values corresponding to the plurality of pixels and the intrinsic parameters 329 of the depth camera 300.

The pattern calibration engine 332 is configured to transform the 3D Cartesian coordinates 336 into illumination coordinates 338 (e.g., $[u_i, v_i]$) for each pixel of the plurality of pixels of each calibration depth image of the plurality of calibration depth images 334 based at least on a baseline set of distortion correction parameters 340 for the depth camera 300. In one example, the baseline set of distortion correction parameters 340 for the depth camera 300 may be set based on empirical testing for a batch of different depth cameras to determine a set of distortion correction parameters that best fit the batch of depth cameras. In other examples, the baseline set of distortion correction parameters 340 can be determined according to a different approach.

The pattern calibration engine 332 is configured to identify locations 342 of the dots in the pattern of dots defined in terms of illumination coordinates in the plurality of calibration depth images 334 for the different distances. Further, the pattern calibration engine 332 is configured to refine the locations of the dots in the pattern of dots across the plurality of calibration depth images at the different distances to produce a set of refined dot location 346. The pattern calibration engine 332 is configured to perform such refining by optimizing the set of distortion correction parameters for the depth camera. For example, the pattern calibration engine 332 may be configured to optimize the set of distortion correction parameters 344 by iteratively adjusting the set of distortion correction parameters 344 relative to the baseline set of distortion correction parameters 340 to reduce or minimize the differences in locations 346 of the dots in the pattern of dots across the plurality of calibration depth images 334 at the different distances.

The pattern calibration engine 332 is configured to output the calibrated reference locations 330 of dots in the reference pattern of dots for the depth camera 300 based at least on the refined locations 346 of the dots in the reference pattern of dots across the plurality of calibration depth images 334.

As discussed herein, the distortion correction engine 320 uses the calibrated reference locations 330 of the dots in the reference pattern of dots to generate the optimized setoff distortion correction parameters 328 that are applied to the raw depth image 314 to produce the distortion corrected depth image 348. More particularly, the distortion correction engine 320 is configured to generate the distortion corrected depth image 348 based at least on translating pixel locations of pixels of the raw depth image 314 according to the set of distortion correction parameters 328.

The distortion correction engine 320 is configured to output the distortion corrected depth image 348. The distortion corrected depth image 348 can be output to different components depending on the implementation. In some examples, the distortion correction engine 320 is configured to output the distortion corrected depth image 348 to a display device. The display device can correspond to a conventional stand-alone video display, an augmented reality headset (e.g., display system 204 of HMD 200 shown in FIG. 2), a display screen on a mobile computing device, a display screen associated with another computing device, and/or any other convenient display device.

In some examples, the distortion correction engine 320 is configured to output the distortion corrected depth image 348 to the storage subsystem 318 where the distortion correction engine 320 is stored in memory of the storage subsystem 318. In some examples, the distortion correction engine 320 is configured to output the distortion corrected depth image 348 to an additional processing component of the depth camera 300 or of a computing device in which the depth camera is integrated (e.g., HMD 200 shown in FIG. 2). The additional processing component may be configured to perform additional processing based at least on the distortion corrected depth image 348. Such an additional processing component can, for example, correspond to a texture mapping and rendering component.

In some examples, the raw depth image 314, the calibration depth images 334, and/or other depth images used for depth camera calibration and/or pattern calibration are captured by the optical sensor 308 in a controlled environment, such as a studio or test space. In the controlled environment, ambient lighting and/or other environmental factors can be controlled/adjusted to a desired level to produce high quality depth images. In some examples, the controlled environment may include particular objects arranged at specified locations/distances from the depth camera 300 to produce depth images in which depth measurements are verifiable based at least on the locations of the objects relative to the depth camera 300 in the controlled environment. In other examples, a less controlled or uncontrolled environment may be used for depth camera calibration and/or pattern calibration.

In some examples, the distortion correction engine 320 may be configured to perform the calibration process for the depth camera 300 repeatedly across the operational lifespan of the depth camera 300 in order to account for changes in components of the depth camera 300. In some examples, the distortion correction engine 320 may be configured to perform the calibration process for the depth camera 300 under different operating conditions to optimize the distortion correction parameters 328 for the different operation conditions. As one example, the distortion correction engine 320 may be configured to perform the calibration process for the depth camera 300 at different distances (e.g., projecting the pattern of dots 306 at different depths). As another example, the distortion correction engine 320 may be configured to perform the calibration process for the depth camera 300 at different temperatures. As another example, the distortion correction engine 320 may be configured to perform the calibration process for the depth camera 300 at different surfaces having different reflective characteristics. As another example, the distortion correction engine 320 may be configured to perform the calibration process for the depth camera 300 at different levels of ambient light. The distortion correction engine 320 may be configured to perform the calibration process for the depth camera 300 under any suitable operation conditions.

Figure 4:
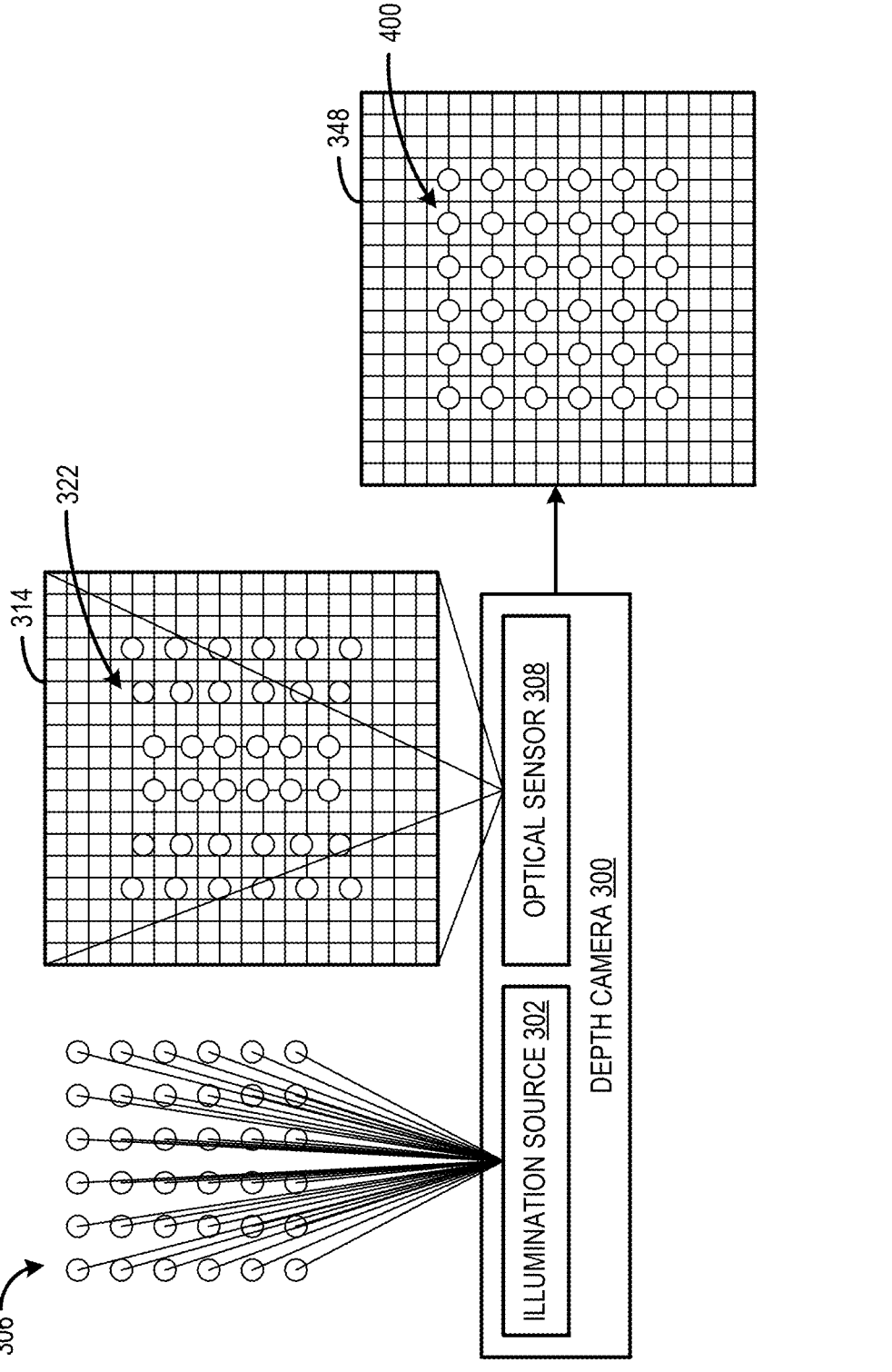
FIG. 4 shows an example scenario where a depth camera outputs a distortion corrected image based at least on performing a calibration method of the present disclosure.

FIG. 4 shows an example scenario where the depth camera 300 outputs the distortion corrected depth image 348 based at least on performing the calibration method of the present disclosure. In particular, the illumination source 302 illuminates the environment with modulated structured light comprising the pattern of dots 306. In the illustrated example, the pattern of dots 306 is a grid of dots arranged in evenly spaced rows and columns. The optical sensor of the depth camera acquires the raw depth image 314 of illumination reflected from the environment. The raw depth image 314 includes the pattern of dots 306 but is distorted based at least on the optical structure of the depth camera 300. In the illustrated example, the raw depth image 314 suffers from a pin cushion type distortion in which the raw image appears to be pinched at its center and stretched out towards the corners.

The depth camera 300 identifies the observed locations 322 of the dots in the pattern of dots in the raw depth image 314. The depth camera 300 applies the objective function to the observed locations 322 of the dots in the pattern of dots in the raw depth image 314 to generate a set of distortion correction parameters (e.g., distortion correction coefficients, principal point, focal length). More particularly, the objective function fits a distortion correction model including the set of distortion correction parameters to the observed locations 322 of the dots in the pattern of dots to reduce a difference between the observed locations 322 of the dots in the pattern of dots and reference locations of dots in a reference pattern of dots. In the illustrated example, the set of distortion correction parameters includes radial distortion correction parameters that compensates for the pin cushion type distortion in the raw depth image 314. The depth camera 300 generates the distortion corrected depth image 348 based at least on translating pixel locations of pixels of the raw depth image 314 according to the set of distortion correction parameters, such that the locations of the dots 400 in the distortion corrected depth image 348 match the actual locations of the dots in the pattern of dots 306 projected by the illumination source 302. In this way, the depth camera 300 can be calibrated to output depth images that have minimal or no distortions and provide accurate depth measurements of imaged objects in the environment.

FIG. 5 shows a flow diagram of an example method 500 for calibrating a depth camera. For example, the method 500 may be performed collectively by the outward facing depth imaging device 234 and the outward facing depth illuminating device 236 of the HMD 200 shown in FIG. 2, by the depth camera 300 shown in FIG. 3, or another suitable depth camera. The method step shown in dotted lines optionally may be performed in some implementations.

In some implementations, at 502, the method 500 may include calibrating a reference pattern of dots for the depth camera based at least on intrinsic parameters of the depth camera. An example pattern calibration method 600 of the present disclosure is discussed in further detail below with reference to FIG. 6. In other implementations, the reference pattern of dots is pre-calibrated for the depth camera based at least on intrinsic parameters of the depth camera. For example, the pre-calibrated reference pattern can be stored in a storage subsystem of the depth camera.

At 504, the method 500 includes illuminating an environment using an illumination source of the depth camera. The illumination source is configured to output modulated structured light comprising a pattern of dots. In some implementations, the illumination source is an IR or NIR illumination source configured to output modulated structured IR or NIR light comprising the pattern of dots.

At 506, the method 500 includes acquiring, via an optical sensor of the depth camera, a raw depth image of illumination reflected from the environment.

At 508, the method 500 includes identifying observed locations of dots in the pattern of dots in the raw depth image.

At 510, the method 500 includes applying an objective function to the observed locations of the dots in the pattern of dots in the raw image to generate a set of distortion correction parameters. The objective function fits a distortion correction model including the set of distortion correction parameters to the observed locations of the dots in the pattern of dots to reduce a difference between the observed locations of the dots in the pattern of dots and reference locations of dots in a reference pattern of dots. In some implementations, the distortion correction model is a lens distortion correction model. More particularly, in some implementations, the lens distortion correction model is a pin cushion distortion correction model, and the set of distortion correction parameters includes radial distortion coefficients. In some implementations, the distortion correction model is a Brown-Conrady model, and the set of distortion correction parameters includes radial distortion coefficients and tangential distortion coefficients. In some implementations, the set of distortion correction parameters includes a principal point of the optical sensor and a focal length of the optical sensor.

At 512, the method 500 includes outputting a distortion corrected depth image generated based at least on translating pixel locations of pixels of the raw depth image according to the set of distortion correction parameters.

The method 500 may be performed by the depth camera to achieve accurate calibration of without using an external target, let alone a complex and costly calibration station. Moreover, since the calibration approach does not require an external target, the calibration approach can be performed dynamically in various environments and can be performed repeatedly over the operational lifespan of the depth camera in order to maintain calibration.

Furthermore, by projecting the sparse depth pattern of dots having a high SNR and acquiring images of the pattern of dots, the depth camera provides the benefit of allowing for the calibration method to be performed in diverse ambient lighting conditions while still providing accurate calibration without requiring an external target. Further, by applying the objective function to fit the distortion correction model to the observed locations of the dots in the pattern of dots, the depth camera produces a highly accurate set of distortion correction parameters that allows for precise calibration of the depth camera.

Figure 6:
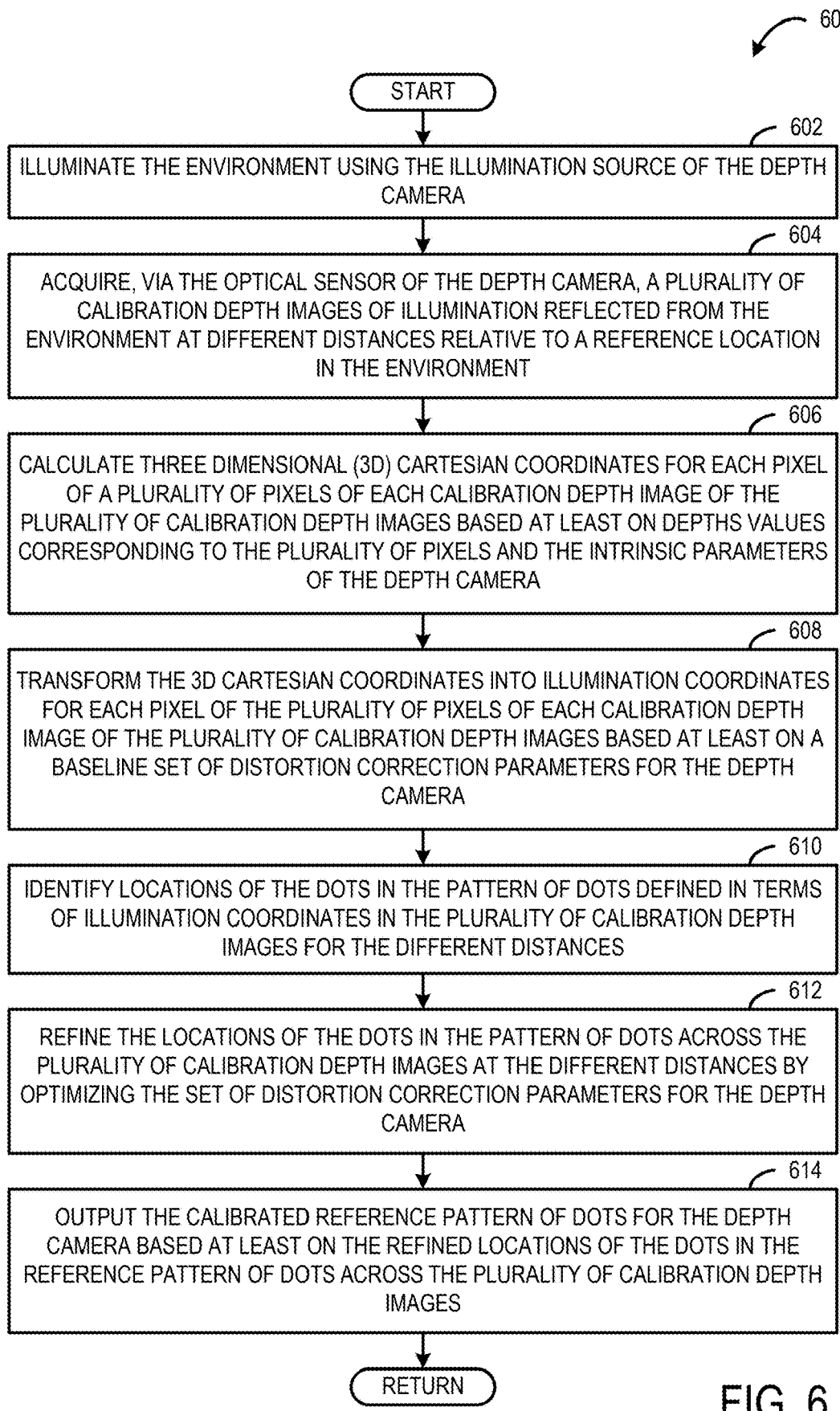
FIG. 6 shows a flow diagram of an example method for calibrating a reference pattern of dots used to calibrate a depth camera.

FIG. 6 shows a flow diagram of an example method 600 for calibrating a reference pattern of dots used to calibrate a depth camera. For example, the method 600 may be performed collectively by the outward facing depth imaging device 234 and the outward facing depth illuminating device 236 of the HMD 200 shown in FIG. 2, by the depth camera 300 shown in FIG. 3, or another suitable depth camera. In some examples, the method 600 may be performed as a sub-routine of the method step 502 of the 500 shown in FIG. 5

At 602, the method 600 includes illuminating the environment using the illumination source of the depth camera. The illumination source is configured to output modulated structured light comprising a pattern of dots.

At 604, the method 600 includes acquiring, via the optical sensor of the depth camera, a plurality of calibration depth images of illumination reflected from the environment at different distances relative to a reference location in the environment.

At 606, the method 600 includes calculating 3D Cartesian coordinates for each pixel of a plurality of pixels of each calibration depth image of the plurality of calibration depth images based at least on depths values corresponding to the plurality of pixels and the intrinsic parameters of the depth camera.

At 608, the method 600 includes transforming the 3D Cartesian coordinates into illumination coordinates for each pixel of the plurality of pixels of each calibration depth image of the plurality of calibration depth images based at least on a baseline set of distortion correction parameters for the depth camera. The illumination coordinates describe pixel positions in a normalized coordinate system corresponding to the 2D pixel grid of the optical sensor of the depth camera (e.g., (u, v) representing the horizontal position and the vertical position within this normalized space).

At 610, the method 600 includes identifying locations of the dots in the pattern of dots defined in terms of illumination coordinates in the plurality of calibration depth images for the different distances.

At 612, the method 600 includes refining the locations of the dots in the pattern of dots across the plurality of calibration depth images at the different distances by optimizing the set of distortion correction parameters for the depth camera. In some examples, the locations of the dots are refined to match across the plurality of calibration depth images at the different distances.

At 614, the method 600 includes outputting the calibrated reference pattern of dots for the depth camera based at least on the refined locations of the dots in the reference pattern of dots across the plurality of calibration depth images.

The method 600 may be performed to ensure that that locations of the dots in the reference pattern of dots is calibrated for the depth camera. By calibrating the reference pattern of dots for the depth camera, the overall calibration process for the depth camera can be made more accurate such that the distortion corrected images output by the calibrated depth camera may include minimal or no distortion.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
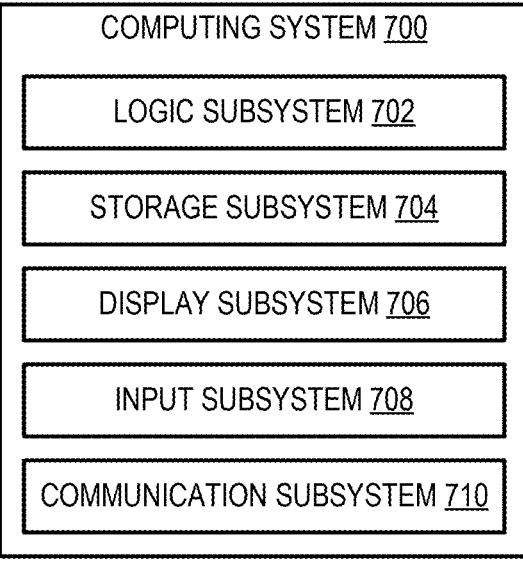
FIG. 7 schematically shows an example computing system.

FIG. 7 schematically shows a simplified representation of a computing system 700 configured to provide any to all of the compute functionality described herein. Computing system 700 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IOT) devices, embedded computing devices, and/or other computing devices. For example, the computing system 700 may correspond to the HMD 104 shown in FIG. 1, the HMD 200 shown in FIG. 2, and the depth camera 300 shown in FIGS. 3 and 4.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

The terms "module," "program," and "engine" may be used to describe an aspect of computing system 700 implemented to perform a particular function. In some cases, a module, program, or engine may be instantiated via logic subsystem 702 executing instructions held by storage subsystem 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

In an example, a method for calibrating a depth camera comprises illuminating an environment using an illumination source of the depth camera, wherein the illumination source is configured to output modulated structured light comprising a pattern of dots, acquiring, via an optical sensor of the depth camera, a raw depth image of illumination reflected from the environment, identifying observed locations of dots in the pattern of dots in the raw depth image, applying an objective function to the observed locations of the dots in the pattern of dots in the raw image to generate a set of distortion correction parameters, wherein the objective function fits a distortion correction model including the set of distortion correction parameters to the observed locations of the dots in the pattern of dots to reduce a difference between the observed locations of the dots in the pattern of dots and reference locations of dots in a reference pattern of dots, and outputting a distortion corrected depth image generated based at least on translating pixel locations of pixels of the raw depth image according to the set of distortion correction parameters. In this example and/or other examples, the reference pattern of dots may be pre-calibrated for the depth camera based at least on intrinsic parameters of the depth camera. In this example and/or other examples, the method may further comprises calibrating the reference pattern of dots for the depth camera based at least on intrinsic parameters of the depth camera. In this example and/or other examples, calibrating the reference pattern of dots for the depth camera may comprise illuminating the environment using the illumination source, acquiring, via the optical sensor, a plurality of calibration depth images of illumination reflected from the environment at different distances relative to a reference location in the environment, calculating three dimensional (3D) Cartesian coordinates for each pixel of a plurality of pixels of each calibration depth image of the plurality of calibration depth images based at least on depths values corresponding to the plurality of pixels and the intrinsic parameters of the depth camera, transforming the 3D Cartesian coordinates into illumination coordinates for each pixel of the plurality of pixels of each calibration depth image of the plurality of calibration depth images based at least on a baseline set of distortion correction parameters for the depth camera, identifying locations of the dots in the pattern of dots defined in terms of illumination coordinates in the plurality of calibration depth images for the different distances, refining the locations of the dots in the pattern of dots across the plurality of calibration depth images at the different distances by optimizing the set of distortion correction parameters for the depth camera, and outputting the calibrated reference pattern of dots for the depth camera based at least on the refined locations of the dots in the reference pattern of dots across the plurality of calibration depth images. In this example and/or other examples, the distortion correction model may be a lens distortion correction model. In this example and/or other examples, the lens distortion correction model may be a pin cushion distortion correction model, and wherein the set of distortion correction parameters includes radial distortion coefficients. In this example and/or other examples, the distortion correction model may be a Brown-Conrady model, and the set of distortion correction parameters may include radial distortion coefficients and tangential distortion coefficients. In this example and/or other examples, the set of distortion correction parameters may include a principal point of the optical sensor and a focal length of the optical sensor. In this example and/or other examples, the illumination source may be an infrared (IR) or near-infrared (NIR) illumination source configured to output modulated structured IR or NIR light comprising the pattern of dots.

In another example, a depth camera, comprises an illumination source configured to output modulated structured light comprising a pattern of dots, an optical sensor, a logic subsystem, and a storage subsystem holding instructions executable by the logic subsystem to illuminate an environment using the illumination source, acquire, via the optical sensor, a raw depth image of illumination reflected from the environment, identify observed locations of dots in the pattern of dots in the raw depth image, apply an objective function to the observed locations of the dots in the pattern of dots in the raw image to generate a set of distortion correction parameters, wherein the objective function fits a distortion correction model including the set of distortion correction parameters to the observed locations of the dots in the pattern of dots to reduce a difference between the observed locations of the dots in the pattern of dots and reference locations of dots in a reference pattern of dots, and output a distortion corrected depth image generated based at least on translating pixel locations of pixels of the raw depth image according to the set of distortion correction parameters. In this example and/or other examples, the reference pattern of dots may be pre-calibrated based at least on intrinsic parameters of the depth camera. In this example and/or other examples, the storage subsystem may hold instructions executable by the logic subsystem to calibrate the reference pattern of dots for the depth camera based at least on intrinsic parameters of the depth camera. In this example and/or other examples, the storage subsystem may hold instructions executable by the logic subsystem to calibrate the reference pattern of dots by illuminate the environment using the illumination source, acquire, via the optical sensor, a plurality of calibration depth images of illumination reflected from the environment at different distances relative to a reference location in the environment, calculate three dimensional (3D) Cartesian coordinates for each pixel of a plurality of pixels of each calibration depth image of the plurality of calibration depth images based at least on depths values corresponding to the plurality of pixels and the intrinsic parameters of the depth camera, transform the 3D Cartesian coordinates into illumination coordinates for each pixel of the plurality of pixels of each calibration depth image of the plurality of calibration depth images based at least on a baseline set of distortion correction parameters for the depth camera, identify locations of the dots in the pattern of dots defined in terms of illumination coordinates in the plurality of calibration depth images for the different distances, refine the locations of the dots in the pattern of dots across the plurality of calibration depth images at the different distances by optimizing the set of distortion correction parameters for the depth camera, and output the calibrated reference pattern of dots for the depth camera based at least on the refined locations of the dots in the reference pattern of dots across the plurality of calibration depth images. In this example and/or other examples, the distortion correction model may be a lens distortion correction model. In this example and/or other examples, the lens distortion correction model may be a pin cushion distortion correction model, and wherein the set of distortion correction parameters includes radial distortion coefficients. In this example and/or other examples, the distortion correction model may be a Brown-Conrady model, and the set of distortion correction parameters may include radial distortion coefficients and tangential distortion coefficients. In this example and/or other examples, the set of distortion correction parameters may include a principal point of the optical sensor and a focal length of the optical sensor. In this example and/or other examples, the illumination source may be an infrared (IR) or near-infrared (NIR) illumination source configured to output modulated structured IR or NIR light comprising the pattern of dots.

In yet another example, a storage device holding instructions executable by a logic subsystem to illuminate an environment using an illumination source of a depth camera, wherein the illumination source is configured to output modulated structured light comprising a pattern of dots, acquire, via an optical sensor of the depth camera, a raw depth image of illumination reflected from the environment, identify observed locations of dots in the pattern of dots in the raw depth image, apply an objective function to the observed locations of the dots in the pattern of dots in the raw image to generate a set of distortion correction parameters, wherein the objective function fits a distortion correction model including the set of distortion correction parameters to the observed locations of the dots in the pattern of dots to reduce a difference between the observed locations of the dots in the pattern of dots and reference locations of dots in a reference pattern of dots, and output a distortion corrected depth image generated based at least on translating pixel locations of pixels of the raw depth image according to the set of distortion correction parameters. In this example and/or other examples, the distortion correction model may be a Brown-Conrady model, and the set of distortion correction parameters may include radial distortion coefficients and tangential distortion coefficients.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for calibrating a depth camera comprising:
illuminating an environment using an illumination source of the depth camera, wherein the illumination source is configured to output modulated structured light comprising a pattern of dots;
acquiring, via an optical sensor of the depth camera, a raw depth image of illumination reflected from the environment;
identifying observed locations of dots in the pattern of dots in the raw depth image;
applying an objective function to the observed locations of the dots in the pattern of dots in the raw image to generate a set of distortion correction parameters, wherein the set of distortion correction parameters includes a principal point of the optical sensor and a focal length of the optical sensor, wherein the objective function fits a distortion correction model including the set of distortion correction parameters to the observed locations of the dots in the pattern of dots to reduce a difference between the observed locations of the dots in the pattern of dots and reference locations of dots in a reference pattern of dots; and
outputting a distortion corrected depth image generated based at least on translating pixel locations of pixels of the raw depth image according to the set of distortion correction parameters.

2. The method of claim 1, wherein the reference pattern of dots is pre-calibrated for the depth camera based at least on intrinsic parameters of the depth camera.

3. The method of claim 1, further comprising:
calibrating the reference pattern of dots for the depth camera based at least on intrinsic parameters of the depth camera.

4. The method of claim 3, wherein calibrating the reference pattern of dots for the depth camera comprises:
illuminating the environment using the illumination source;
acquiring, via the optical sensor, a plurality of calibration depth images of illumination reflected from the environment at different distances relative to a reference location in the environment;
calculating three dimensional (3D) Cartesian coordinates for each pixel of a plurality of pixels of each calibration depth image of the plurality of calibration depth images based at least on depths values corresponding to the plurality of pixels and the intrinsic parameters of the depth camera;
transforming the 3D Cartesian coordinates into illumination coordinates for each pixel of the plurality of pixels of each calibration depth image of the plurality of calibration depth images based at least on a baseline set of distortion correction parameters for the depth camera;
identifying locations of the dots in the pattern of dots defined in terms of illumination coordinates in the plurality of calibration depth images for the different distances;
refining the locations of the dots in the pattern of dots across the plurality of calibration depth images at the different distances by optimizing the set of distortion correction parameters for the depth camera; and
outputting the calibrated reference pattern of dots for the depth camera based at least on the refined locations of the dots in the reference pattern of dots across the plurality of calibration depth images.

5. The method of claim 1, wherein the distortion correction model is a lens distortion correction model.

6. The method of claim 5, wherein the lens distortion correction model is a pin cushion distortion correction model, and wherein the set of distortion correction parameters includes radial distortion coefficients.

7. The method of claim 1, wherein the distortion correction model is a Brown-Conrady model, and wherein the set of distortion correction parameters includes radial distortion coefficients and tangential distortion coefficients.

8. The method of claim 1, wherein the illumination source is an infrared (IR) or near-infrared (NIR) illumination source configured to output modulated structured IR or NIR light comprising the pattern of dots.

9. A depth camera, comprising:
an illumination source configured to output modulated structured light comprising a pattern of dots;
an optical sensor;
a logic subsystem; and
a storage subsystem holding instructions executable by the logic subsystem to:
illuminate an environment using the illumination source;
acquire, via the optical sensor, a raw depth image of illumination reflected from the environment;
identify observed locations of dots in the pattern of dots in the raw depth image;
apply an objective function to the observed locations of the dots in the pattern of dots in the raw image to generate a set of distortion correction parameters, wherein the set of distortion correction parameters includes a principal point of the optical sensor and a focal length of the optical sensor, wherein the objective function fits a distortion correction model including the set of distortion correction parameters to the observed locations of the dots in the pattern of dots to reduce a difference between the observed locations of the dots in the pattern of dots and reference locations of dots in a reference pattern of dots; and output a distortion corrected depth image generated based at least on translating pixel locations of pixels of the raw depth image according to the set of distortion correction parameters.

10. The depth camera of claim 9, wherein the reference pattern of dots is pre-calibrated based at least on intrinsic parameters of the depth camera.

11. The depth camera of claim 9, wherein the storage subsystem holds instructions executable by the logic subsystem to:

calibrate the reference pattern of dots for the depth camera based at least on intrinsic parameters of the depth camera.

12. The depth camera of claim 11, wherein the storage subsystem holds instructions executable by the logic subsystem to calibrate the reference pattern of dots by:

illuminate the environment using the illumination source;

acquire, via the optical sensor, a plurality of calibration depth images of illumination reflected from the environment at different distances relative to a reference location in the environment;

calculate three dimensional (3D) Cartesian coordinates for each pixel of a plurality of pixels of each calibration depth image of the plurality of calibration depth images based at least on depths values corresponding to the plurality of pixels and the intrinsic parameters of the depth camera;

transform the 3D Cartesian coordinates into illumination coordinates for each pixel of the plurality of pixels of each calibration depth image of the plurality of calibration depth images based at least on a baseline set of distortion correction parameters for the depth camera;

identify locations of the dots in the pattern of dots defined in terms of illumination coordinates in the plurality of calibration depth images for the different distances;

refine the locations of the dots in the pattern of dots across the plurality of calibration depth images at the different distances by optimizing the set of distortion correction parameters for the depth camera; and output the calibrated reference pattern of dots for the depth camera based at least on the refined locations of the dots in the reference pattern of dots across the plurality of calibration depth images.

13. The depth camera of claim 9, wherein the distortion correction model is a lens distortion correction model.

14. The depth camera of claim 13, wherein the lens distortion correction model is a pin cushion distortion correction model, and wherein the set of distortion correction parameters includes radial distortion coefficients.

15. The depth camera of claim 9, wherein the distortion correction model is a Brown-Conrady model, and wherein the set of distortion correction parameters includes radial distortion coefficients and tangential distortion coefficients.

16. The depth camera of claim 9, wherein the illumination source is an infrared (IR) or near-infrared (NIR) illumination source configured to output modulated structured IR or NIR light comprising the pattern of dots.

17. A storage device holding instructions executable by a logic subsystem to:

illuminate an environment using an illumination source of a depth camera, wherein the illumination source is configured to output modulated structured light comprising a pattern of dots;

acquire, via an optical sensor of the depth camera, a raw depth image of illumination reflected from the environment;

identify observed locations of dots in the pattern of dots in the raw depth image;

apply an objective function to the observed locations of the dots in the pattern of dots in the raw image to generate a set of distortion correction parameters, wherein the set of distortion correction parameters includes a principal point of the optical sensor and a focal length of the optical sensor, wherein the objective function fits a distortion correction model including the set of distortion correction parameters to the observed locations of the dots in the pattern of dots to reduce a difference between the observed locations of the dots in the pattern of dots and reference locations of dots in a reference pattern of dots; and output a distortion corrected depth image generated based at least on translating pixel locations of pixels of the raw depth image according to the set of distortion correction parameters.

18. The storage device of claim 17, wherein the distortion correction model is a Brown-Conrady model, and wherein the set of distortion correction parameters includes radial distortion coefficients and tangential distortion coefficients.

* * * * *